(12) United States Patent
Kwiatkowski

(10) Patent No.: US 9,401,024 B2
(45) Date of Patent: Jul. 26, 2016

(54) MEASURING DEVICE FOR DETERMINING THE SPATIAL POSITION OF AN AUXILIARY MEASURING INSTRUMENT

(75) Inventor: Tomasz Kwiatkowski, Moosleerau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 199 days.

(21) Appl. No.: 14/238,700

(22) PCT Filed: Jul. 31, 2012

(86) PCT No.: PCT/EP2012/064962
§ 371 (c)(1),
(2), (4) Date: Mar. 21, 2014

(87) PCT Pub. No.: WO2013/023904
PCT Pub. Date: Feb. 21, 2013

(65) Prior Publication Data
US 2014/0211999 A1 Jul. 31, 2014

(30) Foreign Application Priority Data
Aug. 12, 2011 (EP) .................................... 11177500

(51) Int. Cl.
*G06K 9/00* (2006.01)
*G06T 7/00* (2006.01)
(Continued)

(52) U.S. Cl.
CPC ................. *G06T 7/0042* (2013.01); *G01C 1/04* (2013.01); *G01C 15/002* (2013.01); *G01S 5/163* (2013.01); *G06T 2207/30244* (2013.01)

(58) Field of Classification Search
CPC .................. G06T 7/0042; G06T 2207/30244; G01C 1/04; G01C 15/002; G01S 5/163
See application file for complete search history.

(56) References Cited

U.S. PATENT DOCUMENTS

| 4,809,066 A * | 2/1989 | Leberl .................... G06K 11/00 |
| | | 348/137 |
| 5,198,877 A | 3/1993 | Schulz |

(Continued)

FOREIGN PATENT DOCUMENTS

| EP | 0 553 266 A4 | 10/1993 |
| EP | 1 515 152 A1 | 3/2005 |

(Continued)

OTHER PUBLICATIONS

European Search Report dated Mar. 30, 2012 as received in Application No. EP 11 17 7500.

*Primary Examiner* — Shefali Goradia
(74) *Attorney, Agent, or Firm* — Maschoff Brennan

(57) ABSTRACT

A positioning method continuously determines the spatial position of an auxiliary measuring instrument having several auxiliary-point markings in a fixed, known spatial distribution relative to one another. Camera images of the auxiliary-point markings are continually recorded using a camera having a surface sensor that includes pixels, and read-out processes are continually performed by reading out the pixels with regard to a respective current exposure value. Image positions of the imaged auxiliary-point markings in the respective current camera image are determined, with which the current spatial position of the auxiliary measuring instrument is derived. Respective current areas of interest on the surface sensor are continually set using image positions determined in at least one previously recorded camera image. The current image positions are determined using exclusively only at most those current exposure values that are received by pixels of the surface sensor lying within the currently set areas of interest.

23 Claims, 9 Drawing Sheets

(51) Int. Cl.
  *G01C 1/04*    (2006.01)
  *G01S 5/16*    (2006.01)
  *G01C 15/00*   (2006.01)

(56) References Cited

U.S. PATENT DOCUMENTS

| | | |
|---|---|---|
| 5,227,985 A | 7/1993 | DeMenthon |
| 5,734,736 A | 3/1998 | Palmer et al. |
| 5,828,770 A * | 10/1998 | Leis .................. G01S 5/163 382/103 |
| 5,973,788 A | 10/1999 | Pettersen et al. |
| 6,310,644 B1 | 10/2001 | Keightley |
| 6,993,158 B2 | 1/2006 | Cho et al. |
| 7,193,608 B2 * | 3/2007 | Stuerzlinger ......... G06F 3/0386 345/156 |
| 7,327,446 B2 | 2/2008 | Cramer et al. |
| 7,576,836 B2 | 8/2009 | Bridges |
| 7,842,911 B2 | 11/2010 | Kirschner et al. |
| 8,199,194 B2 * | 6/2012 | Troy .................. G01S 5/163 348/94 |
| 2002/0131643 A1 | 9/2002 | Fels et al. |
| 2005/0156888 A1 | 7/2005 | Xie et al. |

FOREIGN PATENT DOCUMENTS

| | | |
|---|---|---|
| EP | 2133659 A1 | 12/2009 |
| EP | 2 010 941 B1 | 11/2010 |
| EP | 2 008 120 B1 | 12/2010 |
| EP | 2 405 236 A1 | 1/2012 |
| JP | 03-094386 A | 4/1991 |
| JP | 03-138504 A | 6/1991 |
| JP | 08-230798 A | 9/1996 |
| JP | 10-197230 A | 7/1998 |
| JP | 2003-141545 A | 5/2003 |
| JP | 2007-504459 A | 3/2007 |
| JP | 2007-524158 A | 8/2007 |
| WO | 93/07443 A1 | 4/1993 |
| WO | 97/14015 A1 | 4/1997 |
| WO | 2004/071069 A2 | 8/2004 |

* cited by examiner

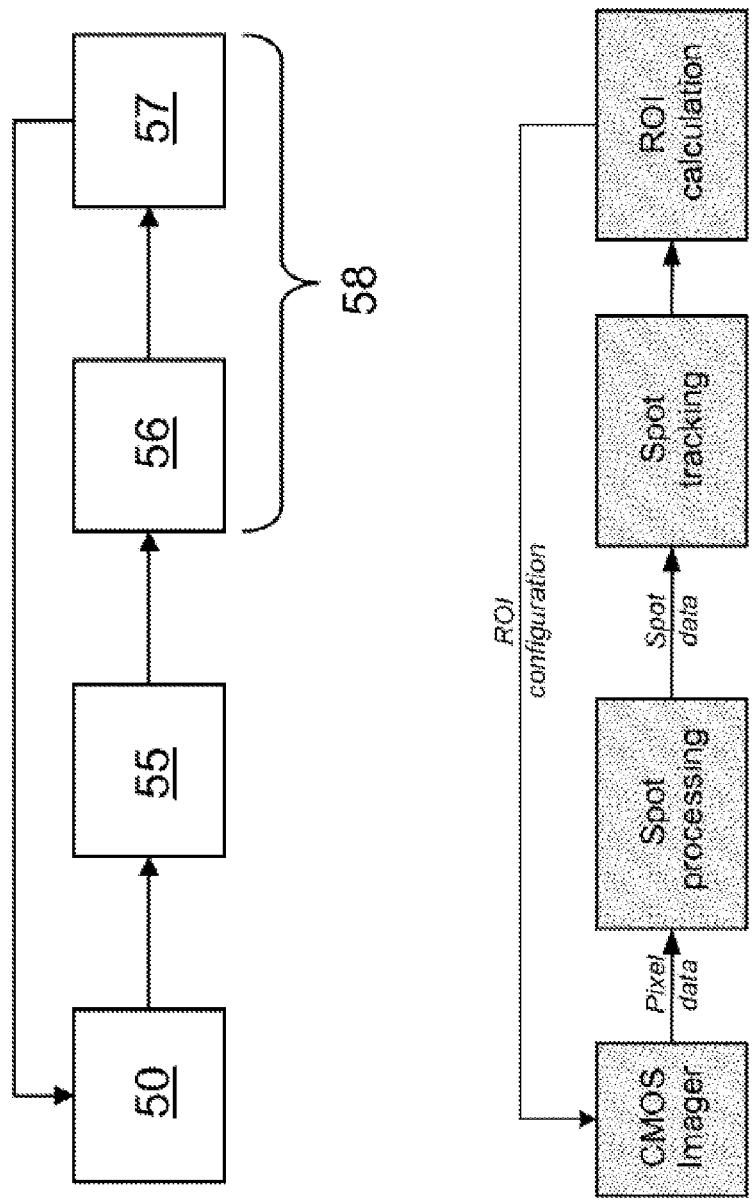

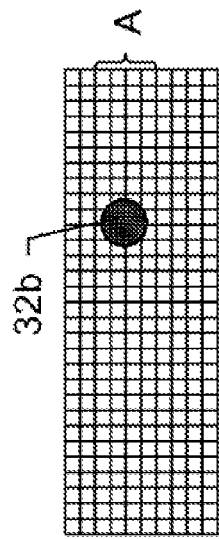
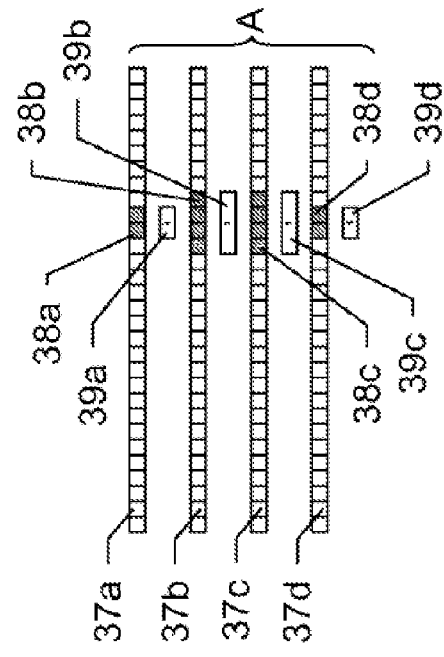
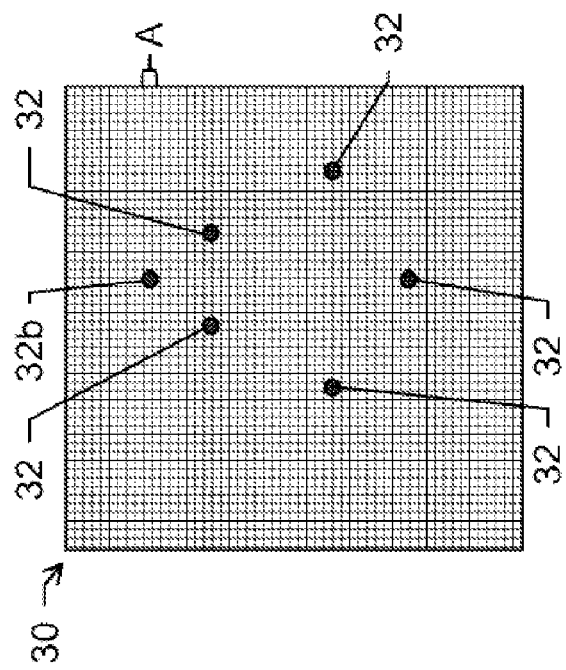
Fig. 6b
Fig. 6c
Fig. 6a

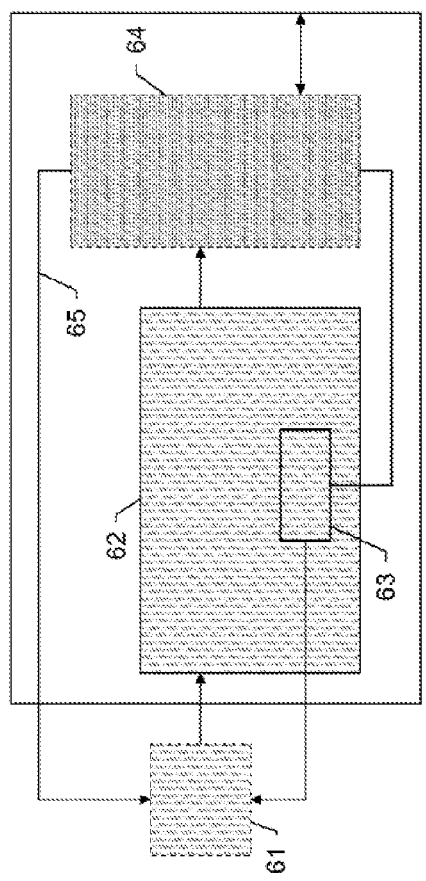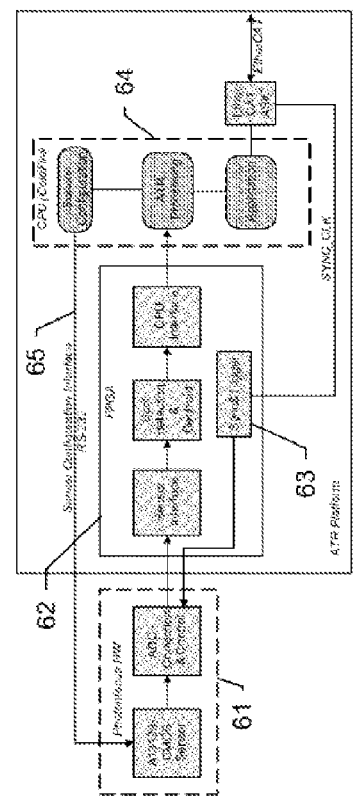
Fig. 8b
Fig. 8a

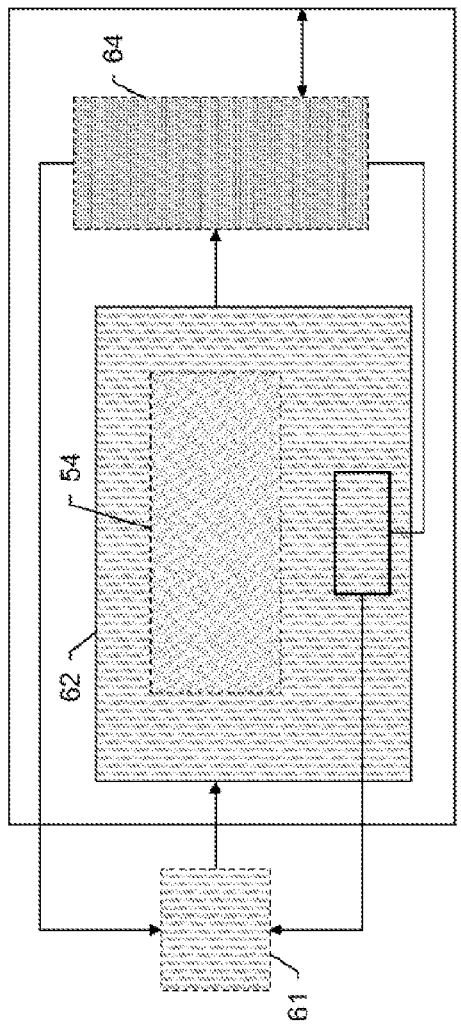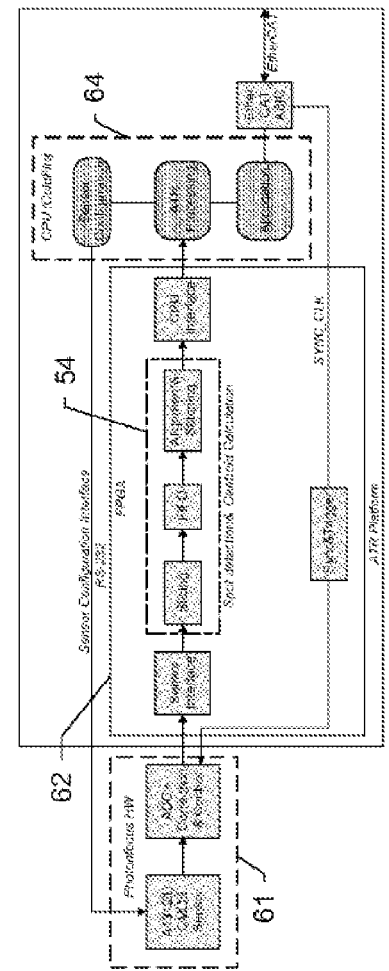

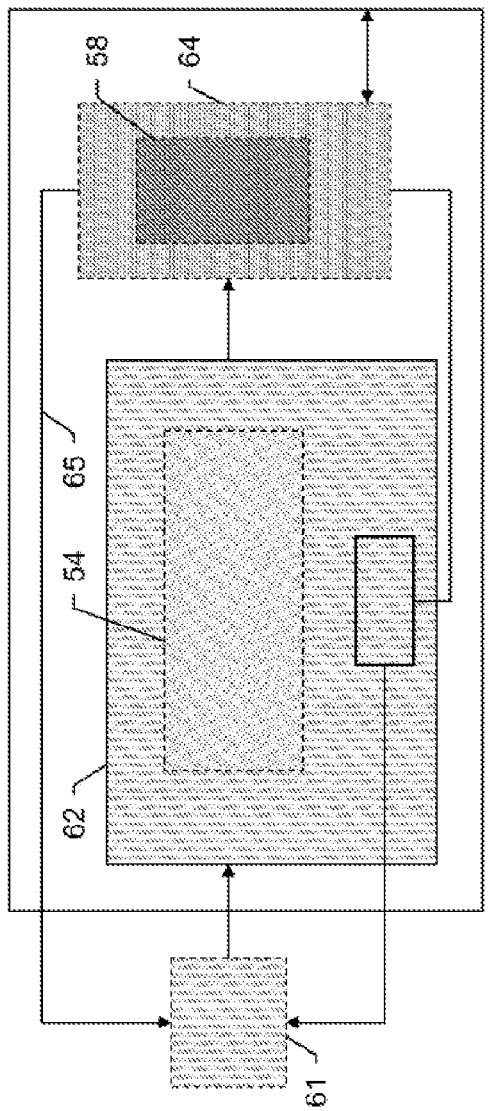
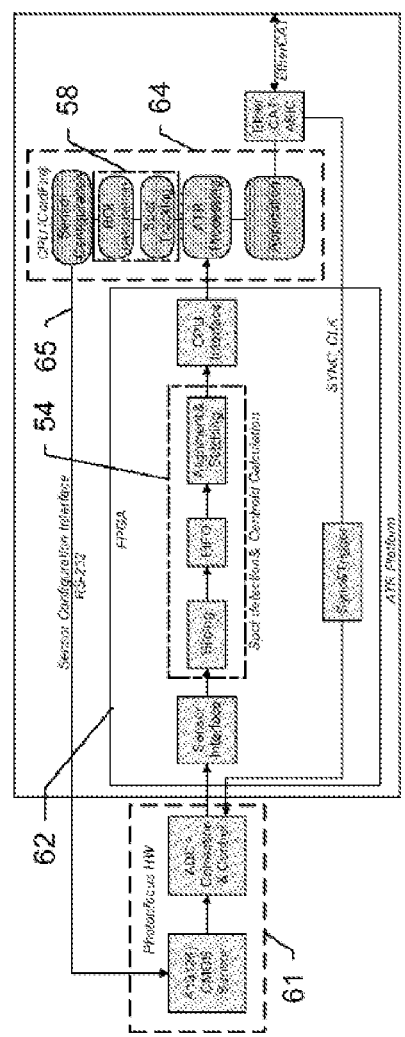
Fig. 10b
Fig. 10a

MEASURING DEVICE FOR DETERMINING THE SPATIAL POSITION OF AN AUXILIARY MEASURING INSTRUMENT

FIELD OF THE INVENTION

The invention relates to methods for continuously determining a spatial position of an auxiliary measuring instrument, in particular by means of a laser tracker, corresponding measuring devices, and a computer program product.

BACKGROUND

Measuring apparatuses designed for continuously tracking a target point and coordinatively determining the position of said point can generally be combined under the term laser tracker. In this case, a target point can be represented by a retroreflective unit (e.g. cube prism) which is targeted by an optical measurement beam of the measuring apparatus, in particular a laser beam. The laser beam is reflected back to the measuring apparatus in a parallel fashion, the reflected beam being detected by a detection unit of the apparatus. In this case, firstly, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the target point is ascertained, e.g. by means of propagation time or phase difference measurement, and—increasingly in a standardized manner in modern systems—an offset of the received beam from a zero position is ascertained on a sensor. By means of this offset that is measurable in this way, it is possible to determine a difference in position between the center of a retroreflector and the impingement point of the laser beam on the reflector and it is possible to correct or readjust the alignment of the laser beam depending on this deviation in such a way that the offset on the sensor is reduced, in particular is "zero" and the beam is thus aligned in the direction of the reflector center. As a result of the readjustment of the laser beam alignment, continuous target tracking of the target point can be carried out and the distance and position of the target point can be determined continuously relative to the measuring device. The readjustment can be realized in this case by means of a change in alignment of the deflection mirror provided for deflecting the laser beam, said deflection mirror being movable in a motorized manner, and/or by pivoting of the targeting unit having the beam-guiding laser optical unit.

Laser trackers according to the prior art can additionally be embodied with an optical image detection unit with a two-dimensional, light-sensitive array, e.g. a CCD or CID camera or a camera based on a CMOS array, or with a pixel array sensor and with an image processing unit. In this case, the laser tracker and the camera are mounted one on top of another in particular in such a way that their positions cannot be altered relative to one another. The camera is arranged, for example, in a manner rotatable together with the laser tracker about the substantially perpendicular axis thereof, but in a manner pivotable up and down independently of the laser tracker and thus, in particular, separately from the optical unit for the laser beam. In particular, the camera can have a fisheye optical unit and pivoting of the camera can thus be avoided, or the necessity thereof can at least be reduced, on account of a very large image detection range of the camera. Furthermore, the camera—e.g. depending on the respective application—can be embodied as pivotable only about one axis. In alternative embodiments, the camera can be installed in an integrated design together with the laser optical unit in a common housing.

With the detection and evaluation of an image—by means of an image detection and image processing unit—of a so-called auxiliary measuring instrument with markings whose relative position with respect to one another is known, it is thus possible to deduce an orientation of an object (e.g. a probe) arranged on the auxiliary measuring instrument in space. Together with the determined spatial position of the target point, it is furthermore possible to precisely determine the position and orientation of the object in space absolutely and/or relative to the laser tracker.

The object whose position and orientation are measured by means of the measuring device mentioned therefore need not be a measuring probe itself, for example, but rather can be the auxiliary measuring instrument. The latter, as part of the measuring system, for the measurement, is brought into a position that is mechanically defined relative to the target object or can be determined during the measurement, wherein, by means of the measured position and orientation of said instrument, it is possible to deduce the position and, if appropriate, the orientation of the measuring probe, for example.

Such auxiliary measuring instruments can be embodied by so-called contact sensing tools that are positioned with their contact point on a point of the target object. The contact sensing tool has markings, e.g. light points, and a reflector, which represents a target point on the contact sensing tool and can be targeted by the laser beam of the tracker, the positions of the markings and of the reflector relative to the contact point of the contact sensing tool being known precisely. The auxiliary measuring instrument can also be, in a manner known to a person skilled in the art, a, for example handheld, scanner equipped for distance measurement for contactless surface measurements, the direction and position of the scanner measurement beam used for the distance measurement relative to the light points and reflectors arranged on the scanner being known precisely. A scanner of this type is described in EP 0 553 266, for example.

For determining the orientation of the auxiliary measuring instrument, a detection direction of the camera is continuously aligned such that an image can be detected in the direction of the tracking beam of the laser tracker. The camera can furthermore have a zoom function, wherein a magnification level can be set depending on the determined distance between laser tracker and target point or auxiliary measuring instrument. With these two adaptation functions (alignment and magnification), the camera can thus continuously detect an image in which the auxiliary measuring instrument and, in particular, the light points of the auxiliary measuring instrument are imaged. An electronically evaluuatable two-dimensional image of a spatial arrangement of light points arises as a result.

The image processing unit is provided for evaluating the image. This can be used to carry out identification of the imaged light points, determination of the centroids of the imaged light points and determination of the image coordinates of said centroids, from which, for example, solid angles between the optical axis of the sensor, in particular the detection direction, and the direction from the sensor to the respective light points can be calculated.

A measuring device of this type comprising a laser tracker and an image detection unit for determining the position and orientation of objects in space on which light points and reflectors are arranged is described in U.S. Pat. No. 5,973,788, for example.

With the use of such measuring devices, e.g. at least three light points which can be registered by the image detection unit and e.g. one reflector that reflects the measurement beam of the laser tracker can be arranged on the object whose position and orientation are to be determined, in known positions relative to the object. The light points to be registered by the image detection unit can be active light sources (e.g. light emitting diodes) or reflectors to be illuminated, wherein the light points can additionally be equipped or arranged in such a way that they are unambiguously distinguishable from one another. Alternatively, it is also known (depending on the required accuracy) to determine the position and orientation of such an auxiliary measuring instrument having light points only with the aid of camera images and the evaluation of the image positions of the recorded light points in the images, i.e. without additional assistance of a (propagation time or phase) distance measurement with a laser unit, as is e.g. also described in the publication documents EP 2 008 120 B1 and EP 2 010 941 B.

In general, a maximum achievable operating speed of these systems—besides the structural features of the tracker or camera—is essentially also determined by a process speed of the image analysis. The speed of performance of the image analysis and thus of the determination of the light point positions in the image is essentially limited by the image processing efficiency and by the volume of data that can be processed in a predefined time interval.

The image data processing speed thus constitutes a main bottleneck of laser trackers with a camera in the prior art. In this case, the image data are read out pixel by pixel and a brightness or color value is determined for each pixel. Each pixel which exceeds a predetermined threshold value is then taken into account in the calculation of respective image centroids with regard to the light points detected in the image. In conventional systems, the detection of the light points in the image is started after the read-out of all pixels of the image sensor (e.g. CMOS) or at least of all pixels which belong to an imaged light spot, and, for example, a respectively detected camera image is processed as a whole or a contiguous part of the image is processed as a whole. Moreover, in these systems as standard all pixels of the sensor are checked with regard to the respective exposure state. For each collection of pixels whose read-out signal lies above the threshold value and so they are illuminated by an identical light spot of the auxiliary measuring means, a centroid is then ascertained mathematically, wherein the position of the centroid in the image represents the position of the respective light point. By virtue of the fact that the determination of the centroids of the light points in the normal case begins only after the read-out of the entire area sensor and this evaluation requires a comparatively high degree of computational complexity and thus also a high degree of time expenditure, there are disturbing latencies between detecting an image and obtaining a result by evaluating the image, which also concerns a maximum achievable repetition rate for continuously recording images and, on the basis thereof, continuously determining the position of the auxiliary measuring instrument and readjusting the alignment of the camera. This can therefore greatly influence the determination and tracking of the orientation of a contact sensing tool (as auxiliary measuring instrument), in particular with regard to continuous position and orientation determination. As a consequence, as a result of this delay in the evaluation of the spatial light point arrangement, e.g. errors can occur in the determination of the exact position of a contact point of the contact sensing tool.

Accordingly, it is a general object of the present invention to provide a measuring apparatus and a measuring method for improved, faster and more reliable determination of a spatial orientation of an auxiliary measuring instrument.

It is a specific object of the present invention to provide, in the context of image detection with an area sensor, read-out of image information from the area sensor and determination of image positions of detected markings of the auxiliary measuring instrument, an improved and faster image evaluation method for images detected by means of the area sensor.

SUMMARY

The invention relates to a position determining method, in particular with the aid of a laser tracker, for continuously determining the spatial position of an auxiliary measuring instrument having at least one auxiliary point marking, in particular wherein the auxiliary measuring instrument has a plurality of auxiliary point markings in fixed known spatial distribution relative to one another. The method involves continuously detecting camera images of the at least one auxiliary point marking by means of a camera with an area sensor having a multiplicity of pixels, and continuously carrying out read-out passes in which at least some of the pixels are read out with regard to a respective current exposure value. Furthermore, the method involves continuously determining at least one image position for the at least one imaged auxiliary point marking in the respective current camera image depending on exposure values obtained in the context of the respective current read-out pass, and, in addition, deriving the respective current spatial position of the auxiliary measuring instrument on the basis of the at least one current image position and, in particular, the fixed known spatial distribution of the auxiliary point markings relative to one another.

According to the invention, in this case at least one respective current region of interest is continuously set on the area sensor depending on a collection of the at least one determined image position in at least one previously detected camera image. In this case, the at least one region of interest in each case defines a delimited subset of contiguous neighboring pixels from the totality of the pixels of the area sensor. The at least one current image position is determined taking account of exclusively at most those current exposure values which are obtained from pixels of the area sensor which lie within the at least one currently set region of interest.

By way of example, light points (i.e. points which themselves emit light for instance in the spectral or infrared range), reflective (in particular retroreflective) objects such as reflective film points or small cat's eyes, or else only predefined patterns arranged on the auxiliary measuring instrument can be suitable as auxiliary point markings. As known per se to a person skilled in the art, in this case the auxiliary point markings must therefore be designed, in principle, in such a way that they can be reliably identified in a recorded image by image processing and can be unambiguously evaluated with regard to a position in the image.

In connection with the present invention, image position is thus generally understood to mean a position in a recorded image at which the corresponding auxiliary point marking is imaged. The image position thus in other words represents the position of an auxiliary point marking detected and identified in the image.

The region of interest constitutes a region on the sensor within which the pixels exposed therein during image detection are taken into account for evaluating and determining the respective image positions. In other words, according to the invention, it is only within these relevant regions that auxiliary point markings imaged there are taken into account. The position, form and size of a respective region of interest can be adapted in each case individually to the measurement conditions, e.g. to the position, form and size of the auxiliary point marking that is expected to be detected therein.

In particular, the invention relates to a corresponding position determining method for continuously determining an auxiliary measuring instrument having a plurality of auxiliary point markings in fixed known spatial distribution relative to one another, wherein the continuous detection thus involves respectively imaging the plurality of auxiliary point markings and then determining a plurality of image positions (that is to say one each for each auxiliary point marking) in the camera image. The spatial position of the auxiliary measuring instrument is then derived on the basis of the respective determined current image positions and the fixed known spatial distribution of the auxiliary point markings relative to one another. According to the invention, in this case respective current regions of interest are continuously set on the area sensor depending on a collection of image positions determined in at least one previously detected camera image.

During the detection of a plurality of auxiliary point markings, regions of interest can be formed and set in such a way that a region of interest will be set for a plurality of auxiliary point markings to be imaged there, or that a respective region of interest is set for a respective auxiliary point marking.

Such methods can be employed in industrial measurement, in particular. For determining the spatial position of an auxiliary measuring instrument, images are accordingly detected continuously by means of an area sensor of a camera and the pixels of the area sensor are correspondingly read out. The spatial position of the auxiliary measuring instrument can be represented in connection with the present invention firstly by the position of the auxiliary measuring instrument in space and secondly, in particular, by taking account of the spatial orientation or alignment of the instrument.

The pixels can be read out sequentially and line by line (e.g. in other words pixel by pixel within a line and sequentially line by line), the pixels in each case being analyzed with regard to their current exposure state. It is possible here to identify the auxiliary point marking imaged in the image, in particular the plurality of auxiliary point markings, on the sensor by means of the exposure state of said marking(s) and thus to determine an image position for each auxiliary point marking. From this information, e.g. taking account of a known relative arrangement and position of the auxiliary point markings on the auxiliary measuring instrument, it is possible to derive the current spatial position of the auxiliary measuring instrument. The invention involves defining on the area sensor at least one region of interest, in particular a plurality of regions of interest, with a determined number of contiguous pixels, wherein the position of a markings in the image (image position) is determined maximally with the aid of those pixels which lie within the region of interest. The setting of the respective position of the region of interest on the sensor is performed at least with the aid of the image positions which were ascertained in at least one previously recorded image, i.e. in other words by using already present (and stored) information about the position (assumed a short time beforehand) of the auxiliary measuring instrument.

In this case, continuously detecting images by means of the camera should be understood to mean that images are detected and in particular evaluated with a frequency such that—for instance also depending on an expected dynamic range of the auxiliary measuring instrument—continuous tracking of the auxiliary measuring instrument (or of the auxiliary point markings) can be carried out by means of the image analysis. In this case, the frequency is chosen such that even small changes in position and/or orientation of the—usually dynamically moving—auxiliary measuring instrument, which are caused e.g. by a user guiding the auxiliary measuring instrument or a robot arm, are reliably detected and a change in the position of the instrument that is caused as a result can be determined precisely. For this purpose, by way of example, images can be detected and respective position determinations can be carried out with rates of e.g. at least 1 Hz, in particular 10-100 Hz, or else higher than 100 Hz.

One advantage of this position determining method is that a proportion of the sensor pixels is not taken into account for an evaluation and determination of the positions of the imaged markings and the achievable evaluation speed thus increases—on account of a reduced volume of data to be processed. Depending on the definition of the size of the regions which need not be taken into account for the evaluation, said proportion can be considerably larger in comparison with the regions of interest and the data reduction can thus turn out to be significant.

In particular, this can be brought about according to the invention by virtue of the fact that the respective current read-out passes are already carried out in such a way that in each case only exactly the pixels which lie within the at least one current region of interest are read out.

In this case, the overall process is then already shortened by virtue of the fact that the read-out passes already proceed with a reduced time expenditure and the volumes of data generated here—compared with reading out all pixels of the sensor—turn out to be smaller from the outset.

The repetition rate for continuously carrying out the entire method can therefore be increased as a result (in particular here the repetition rate for carrying out the respective read-out passes and thus ultimately also the repetition rate for ascertaining the position of the auxiliary measuring means). By means of increasing the repetition rate it is also possible—as a side effect—to significantly reduce the uncertainty when setting the regions of interest, with the result that the at least one region of interest is redefined more rapidly and thus, during the movement of the auxiliary measuring instrument, the setting of the region of interest can be adapted to the respective change in the position of the auxiliary point marking more rapidly (or to more recent known positional states). In other words, therefore, the uncertainty when setting the regions of interest can already be reduced and, consequently, e.g. at high repetition rates, the regions of interest can be set with a smaller size and thus with a reduced volume of data to be processed. As a result of the smaller amount of data to be processed, the repetition rate can in turn be increased further (recursive method).

In accordance with one development of the invention, in this case, for setting the regions of interest, expected values for the current image positions can be ascertained, which are derived, for instance, from a collection of image positions determined in a plurality of previously (in particular previously successively) detected camera images. In particular, the image positions respectively determined in a plurality of previously detected camera images can serve in this case for feeding a Kalman filter, which is then used to ascertain the expected values for the current (next) image positions of the auxiliary point markings. By using previously recorded images in this way and by evaluating the images with regard to the image positions, it is possible, from an image sequence for a detected marking, for example, to calculate a movement of the marking in the image and thus to anticipate (or predict) a current position of the marking for an image that is currently to be recorded. Such an estimation of the current position to be expected in the image can—as mentioned above—advantageously be carried out by means of a Kalman filter. This filter is fed a large amount of image information, e.g. position, number and size of the detected markings, and a mathematical model is used to carry out a calculation of an expected value for the image position. In this regard, it is possible to set the regions of interest on the sensor exactly in such a way that all auxiliary point markings imaged on the sensor are expected to lie in the regions of interest, or (to put it the other way round) the respective regions of interest can be placed or set e.g. centrally in each case around the image positions that are currently to be expected as per ascertainment.

The invention additionally relates to a measuring device, in particular a laser tracker, for continuously determining the spatial position of an auxiliary measuring instrument having at least one auxiliary point marking, in particular wherein the auxiliary measuring instrument has a plurality of auxiliary point markings in fixed known spatial distribution relative to one another. The measuring device comprises a camera for continuously detecting camera images of the at least one auxiliary point marking, with an area sensor having a multiplicity of pixels, and an evaluation and control unit. The evaluation and control unit is in this case designed for controlling read-out passes which can be carried out continuously and in which at least some of the pixels are read out with regard to a respective current exposure value, for continuously determining at least one image position for the at least one imaged auxiliary point marking in the respective current camera image depending on exposure values obtained in the context of the respective current read-out pass, and for continuously deriving the respective current spatial position of the auxiliary measuring instrument on the basis of the at least one current image position and, in particular, of the fixed known spatial distribution of the auxiliary point markings relative to one another.

Furthermore, the evaluation and control unit is designed for continuously setting at least one current region of interest on the area sensor depending on a collection of the at least one image position determined in at least one previously detected camera image, wherein the at least one region of interest in each case defines a delimited subset of contiguous neighboring pixels from the totality of the pixels of the area sensor. In addition, the evaluation and control unit is designed for taking account—for the determination of the respective at least one current image position—of exclusively at most those current exposure values which are obtained from pixels of the area sensor which lie within the at least one currently set region of interest.

Such a measuring device according to the invention can be used to ascertain very rapidly the spatial position, in particular position information (e.g. the solid angle with respect to the auxiliary point marking or with respect to the auxiliary measuring instrument) and/or orientation, of the auxiliary measuring instrument e.g. of a contact sensing tool with a contact sensor. Such measuring devices are used with corresponding auxiliary measuring instruments in particular in industrial measurement for measuring components or for quality control in manufacturing processes, e.g. between individual manufacturing steps. For this purpose, the evaluation and control unit can be used to define regions of interest from the area sensor depending on previously detected image information such that a number of the pixels within the regions of interest are used for determining an image position of the auxiliary point markings. The determination of the image positions can thus be performed with the aid only of the pixels thus lying in the defined regions of interest and a portion of the sensor data need not be taken into account. This leads to a reduction of the data to be processed and thus to faster data evaluation and position determination. The orientation of the auxiliary measuring instrument can then be derived by means of the determined positions of a plurality of auxiliary point markings, in particular of at least three, in particular of five to eight, markings, in the image—taking account of the fixed known spatial distribution of the auxiliary point markings on the auxiliary measuring instrument.

In particular, according to the invention, the evaluation and control unit can be designed for controlling the read-out passes in such a way that in each case only exactly the pixels which lie within the respective current regions of interest are read out. By alternatively taking account of all pixels within the regions of interest, it is possible, for example, to achieve an accuracy with regard to the determination of the image positions.

In addition, according to the invention, for setting the regions of interest by means of the evaluation and control unit expected values for the current image positions can in each case be ascertainable from a collection of image positions determined in a plurality of previously successively detected camera images, in particular with the aid of a Kalman filter. In this case, from an image collection, for example, a positional change of an image position can be tracked and, from the profile of this positional change, a position that is currently to be expected can be derived and a region of interest can be defined on the area sensor such that the marking to be detected is imaged in this region. Such a model-based calculation can be carried out by means of a Kalman filter, for example.

Furthermore, according to the invention, the measuring device can have a base, adjusting means for changing an alignment of the camera relative to the base in a motorized manner, and angle measuring means for continuously detecting the respective current alignment of the camera. The evaluation and control unit can be designed for continuously controlling the changing of the alignment of the camera in such a way that the latter is continuously aligned with the auxiliary measuring instrument. This design of the measuring device can thus be used to continuously detect an image in the direction of the auxiliary measuring instrument and to carry out the determination of the at least one image position and subsequently the determination of the spatial position of the auxiliary measuring instrument. For this purpose, for alignment, for example, it is possible to carry out an exchange of information with a laser tracker, which targets and tracks the reflector on the auxiliary measuring instrument and determines the position thereof in space, and to set the alignment of the camera depending on the tracker alignment.

Furthermore, according to the invention, the camera can have a lens having a variable focal length, wherein the focal length (and thus the imaging scale of the camera) is continuously variable in a manner automatically controlled by the evaluation and control unit in such a way that the auxiliary measuring instrument is imaged distance-independently substantially with a constant extent on the area sensor. In order to set the focal length it is possible once again to use a distance—ascertained by means of a laser tracker—between tracker and camera (if the camera is arranged at the tracker or has a known relative position with respect thereto) and set a magnification factor such that the auxiliary measuring instrument assumes a predefined extent on the area sensor. In this case, the focal length can be settable in an automated manner by means of a motor, for example. In particular, the camera here can have a panfocal or varifocal lens, wherein, in the case of the design as a varifocal lens, a zoom optic group can then be displaced in a manner coordinated with a focus optic group and, therefore, the focal length and correspondingly the focusing can thus be adapted temporally in parallel.

In particular, according to the invention, the measuring device can be designed as a laser tracker and furthermore have at least one optical distance measuring apparatus which measures in the direction of a target axis and serves for measuring distances to a retroreflector provided on the auxiliary measuring instrument. In addition, the measuring device can have
- adjusting means for changing an alignment of the target axis relative to the base in a motorized manner,
- angle measuring means for continuously detecting the respective current alignment of the target axis, and a measuring and control circuit for tracking the retroreflector of the auxiliary measuring instrument with the target axis, such that the latter is continuously aligned with the retroreflector.

A retroreflector within the meaning of the present invention can be embodied here e.g. by a prism or a reflective film, wherein radiation which impinges on the prism or the film is reflected back in a parallel or coaxial direction.

A further aspect of the invention, which can be regarded both separately and depending on the invention described above, relates to a position determining method according to the same preamble, in particular with the aid of a laser tracker, for continuously determining the spatial position of an auxiliary measuring instrument having at least one auxiliary point marking, in particular wherein the auxiliary measuring instrument has a plurality of auxiliary point markings in fixed known spatial distribution relative to one another. The position determining method involves continuously detecting camera images of the at least one auxiliary point marking by means of a camera with an area sensor having a multiplicity of pixels, and continuously carrying out read-out passes in which at least some of the pixels are read out with regard to a respective current exposure value. In addition, the method involves continuously determining at least one image position for the at least one imaged auxiliary point marking in the respective current camera image depending on exposure values obtained in the context of the respective current read-out pass, and continuously deriving the respective current spatial position of the auxiliary measuring instrument on the basis of the at least one current image position and, in particular, the fixed known spatial distribution of the auxiliary point markings relative to one another.

Furthermore—in accordance with the second aspect of the invention—the at least one image position is determined by the following steps:
- filtering pixels for which the exposure value obtained during read-out fulfills a threshold value criterion, in particular lies above a threshold value,
- joining together filtered pixels that form line regions that are coherent in a line of the area sensor in each case to form pixel slices,
- ascertaining respective centroid portions (subcentroids) for each of the pixel slices,
- grouping the pixel slices in such a way that such pixel slices which belong to the at least one imaged auxiliary point markings are in each case assigned to one another, and
- deriving the at least one image position of the at least one auxiliary point marking with the aid of the corresponding respective centroid portions of the pixel slices which are in each case assigned to one another.

In particular, according to the invention, in the context of the read-out passes the area sensor can be read out pixel by pixel and line by line with a predefined pixel read-out rate, and at the latest directly after completion of the read-out of respectively one line already for this one line the steps of filtering, joining together and ascertaining respective centroid portions, which steps are carried out in the context of determining the at least one image position, in particular a plurality of image positions, are started and carried out.

In particular according to the invention, the steps of filtering, joining together to form pixel slices and ascertaining the centroid portions (subcentroids) can be clocked with a first, comparatively high, rate, which specifically corresponds to the pixel read-out rate, and the steps of grouping and determining the image positions are clocked with a second, comparatively low, rate.

By means of such a procedure, therefore, it is possible—in other words—for those pixels which fulfill the illumination criterion and form coherent line regions, e.g. lie alongside one another in a line, wherein there may be gaps between the pixels caused by individual pixel defects in the coherent line regions, then immediately to be joined together to form pixel slices or line segments (in particular as early as before or while the next line of the sensor is read out), wherein a centroid portion is calculated for each line segment. The slices and centroid portions determined in this way are subsequently grouped such that those pixel slices which belong to an auxiliary point marking form a group. From said group, it is then possible to derive a position of the auxiliary point marking in the image, for example by calculating a total centroid with respect to the pixel slices.

One advantage of this method is that an early evaluation step—namely determining the pixel slices and calculating the centroid portions for the respective pixel slices—can be carried out independently of the entire image information belonging to an auxiliary point marking. Therefore, all the lines containing corresponding image information of an auxiliary point marking do not already have to be read out in order to be able to begin a partial evaluation and determination of partial information which later can be used further for the ultimate final determination of the image position. That is to say that the evaluation can already begin for generating partial information with regard to the image positions of the auxiliary point marking and a reduced volume of data can thus be transferred for further processing in the context of a final evaluation. This determination of the line segments and the centroid portions can be carried out very rapidly (with relatively low computational complexity). Since the volume of data which later is then still to be processed is significantly reduced after transfer, the grouping and final determination of an image position of an auxiliary point marking—with the use of the partial information already present as a result of the partial evaluation—can then be carried out rapidly and with comparatively low remaining computational complexity that is still to be implemented immediately after the completion of the read-out of the further lines on which the auxiliary point marking are imaged.

According to the invention, therefore, the result of the determination of an image position of an auxiliary point marking imaged on the sensor can accordingly be present more rapidly after the completion of the read-out of the last (bottommost) line on which at least one pixel is still illuminated by said auxiliary point marking, since significant parts of the computational complexity required for determining said image position can already be implemented during the line-by-line read-out of those lines which are detected by the corresponding auxiliary point marking spot.

Further embodiments of the measuring device according to the invention are described in the dependent claims or are already analogously described above as developments of the position determining method according to the invention, in particular wherein individual steps of the position determining method can be performed automatically by a correspondingly preprogrammed FPGA or ASIC in accordance with the measuring device according to the invention.

FPGAs (Field Programmable Gate Array) and ASICs (Application-Specific Integrated Circuit) are preprogrammable electronic components designed as integrated circuits. As known per se to a person skilled in the art, by means of their specific programming, processes, such as the above-described determination of image positions, for example, can be performed rapidly and efficiently.

The invention additionally relates to a measuring system comprising a measuring device according to the invention and an auxiliary measuring instrument having at least one auxiliary point marking in particular light points, in particular wherein the auxiliary measuring instrument has a plurality of auxiliary point markings in fixed known spatial distribution relative to one another, in particular wherein the auxiliary measuring instrument has a retroreflector in addition to the at least one auxiliary point markings.

A further subject matter of the invention is a computer program product having program code stored on a machine-readable carrier, for controlling or carrying out the position determining method according to the invention or for carrying out the following steps, carried out in the context of determining the at least one image position:
  filtering pixels,
  joining together filtered pixels that form line regions that are coherent in a line of the area sensor in each case to form pixel slices,
  ascertaining respective centroid portions,
  grouping, and
  deriving the at least one image position of the at least one auxiliary point marking with the aid of the corresponding respective centroid portions of the pixel slices which are in each case assigned to one another,
of the position determining method according to the invention in accordance with the second aspect of the invention, in particular if the program is executed on an FPGA or ASIC.

The methods according to the invention and/or the computer program products can be used in particular in industrial measurement (i.e. for laser trackers which are designed generically for tracking an auxiliary measuring instrument with a plurality of light points and a retroreflector [which likewise constitutes an auxiliary point marking within the meaning of the present invention]). The methods according to the invention can then be used in such a laser tracker both with regard to the area sensor of a camera—usually designated as 6dof camera in the prior art—(i.e. a camera specifically designed for detecting the plurality of light points of the auxiliary measuring instrument—which camera ultimately serves for highly precisely determining the current orientation of the auxiliary measuring instrument) and—alternatively or additionally—with regard to an area sensor (specifically for detecting an offset of the reflected-back laser beam from a central position on the sensor)—often designated as tracking sensor or ATR sensor in the prior art—in each case for controlling the read-out passes and evaluating the images detected by the respective area sensors of both types.

As an alternative to traditional tracking (ATR), wherein a retroreflective point on the auxiliary measuring instrument is illuminated with e.g. infrared laser beams and the position of a returned reflection is determined in the image recorded with the aid of an areal detector that is sensitive—in particular only—in the corresponding wavelength range, or as an alternative to the traditional use of light points provided on the auxiliary measuring instrument for the 6dof determination, it is also possible for one or more concise patterns (e.g. color points) to serve as auxiliary point markings and for a digital camera that operates in the visible spectral range to be provided, by means of which camera images are recorded and image positions of the patterns identified as auxiliary point markings in the image are thereupon determined and this can serve as a basis for the position determination of the auxiliary measuring instrument (as is analogously described for instance in the European patent application bearing the application number EP 10168771.3). The aspects according to the invention for controlling the continuous read-out processes of the area sensor or the continuous evaluation of the images detected in this context can also be used for the case where use is made of concise patterns on the auxiliary measuring instrument as auxiliary point markings and use is made of a digital camera that operates in the visible spectral range with an area sensor.

BRIEF DESCRIPTION OF THE DRAWINGS

The method according to the invention and the apparatus according to the invention are described in greater detail purely by way of an example below on the basis of specific exemplary embodiments that are illustrated schematically in the drawings, further advantages of the invention also being discussed. In the figures, specifically:

FIG. 5 shows a block diagram for a sequence of the image detection and evaluation according to the invention according to the first and/or second embodiment;

FIGS. 6a-c show a further embodiment of an image evaluation according to the invention for the localization of light points in the image;

FIGS. 8a-b show further block diagrams for the sequence of an image evaluation from the image detection up to the further processing of the evaluated image information according to the prior art;

FIGS. 9a-b show two further block diagrams for the sequence of an image evaluation according to the invention;

FIGS. 10a-b show two further block diagrams for the sequence of a further image evaluation according to the invention.

DETAILED DESCRIPTION

Figure 1:
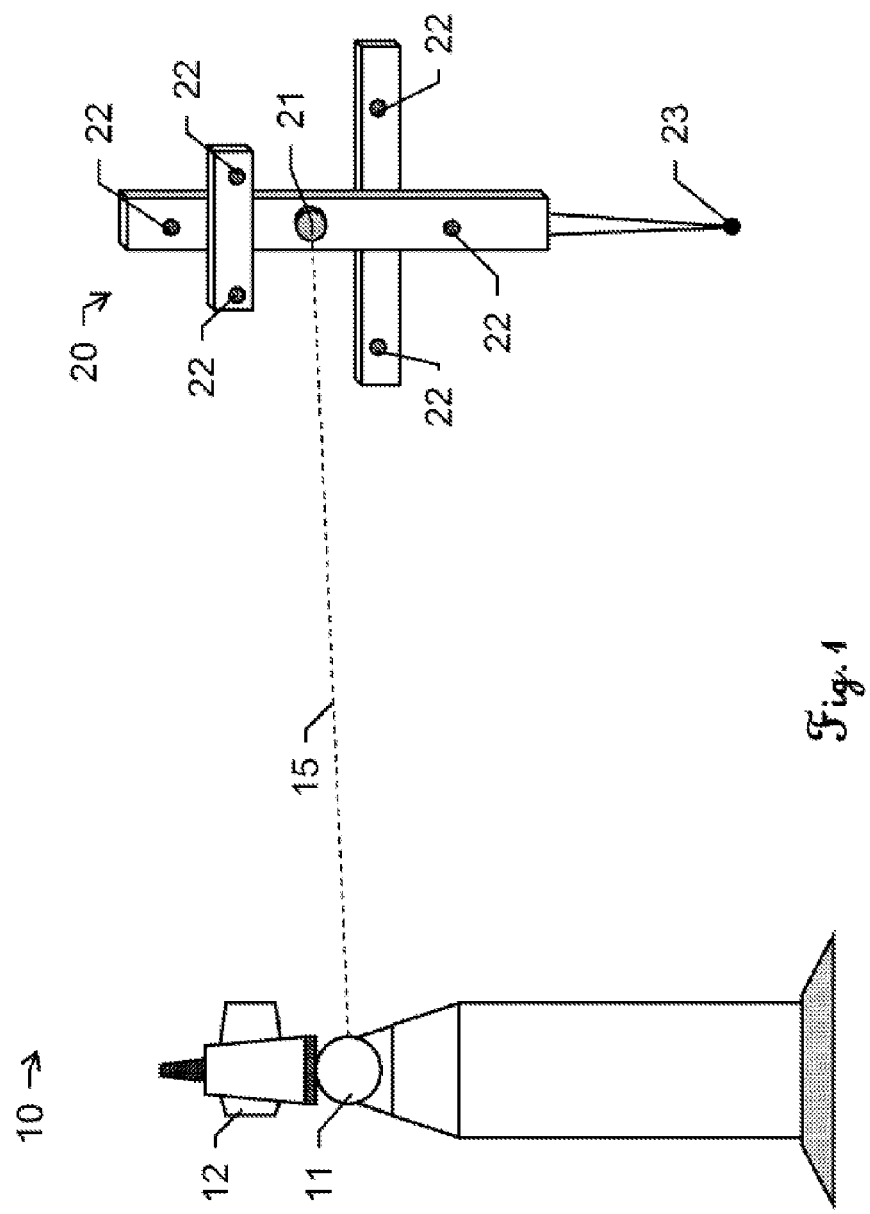
FIG. 1 shows a measuring system according to the invention comprising a laser tracker, an image detection unit and an auxiliary measuring instrument.

FIG. 1 shows a measuring system 10 according to the invention comprising a laser tracker 11, an image detection unit 12 and an auxiliary measuring instrument 20, e.g. a contact sensing tool. The image detection unit 12 can have a CMOS for the purpose of determining the position of a sensor exposure on the sensor or in a detected image or can be designed as a CCD or pixel sensor array camera, in particular. Such sensors allow a position-sensitive detection of detected exposure. Furthermore, the auxiliary measuring instrument 20 has a sensor, the contact point 23 of which can be brought into contact with a target object to be measured. While this contact exists between the contact sensing tool 20 and the target object, a position of the contact point 23 in space and thus the coordinates of a point on the target object can be determined exactly. This determination is carried out by means of a defined relative positioning of the contact point 23 with respect to the reflector 21 and with respect to the markings 22 arranged on the auxiliary measuring instrument 20, which markings can be designed as light emitting diodes, for example. Alternatively, the markings 22 can also be designed in such a way that, upon illumination, e.g. with radiation having a defined wavelength, they reflect the impinging radiation (auxiliary point markings 22 designed as retroreflectors), in particular exhibit a specific luminous characteristic, or that they have a defined pattern or color coding. For this purpose, firstly the position of the reflector 21 or the position of the contact sensing tool 20 and secondly the spatial orientation thereof must be known.

For determining the position, a laser beam 15 is emitted by the laser tracker 11 in the direction of a reflector 21 arranged on the auxiliary measuring instrument 20, is reflected back from there to the tracker 11 in a parallel manner and is detected by means of a receiving unit on the tracker 11. The laser tracker 11 additionally has a distance measuring unit for determining a distance between the tracker 11 and the reflector 21, and goniometers, which make it possible to determine a position of a deflection mirror, by means of which the laser beam 15 can be aligned and guided in a defined manner, and thus a direction of propagation of the laser beam 15. The laser beam 15 can be aligned, in particular, by pivoting of a targeting unit, in which a beam-guiding optical unit and, in particular, a radiation source can be installed. This arrangement described makes it possible to precisely ascertain both the distance and the direction with respect to the reflector 21 or with respect to the contact sensing tool 20.

The orientation of the auxiliary measuring instrument 20 in space is discerned by means of the defined relative position and arrangement of the light emitting diodes 22 provided. For this purpose, an image of the auxiliary measuring instrument 20 with the light emitting diodes 22 is detected by the camera 12 and analyzed according to the invention by an image processing unit. In particular, the image can be detected wavelength-selectively in such a way that the wavelength of the light emitted by the light emitting diodes 22 is detected by a sensor of the camera or is transmitted to the sensor by means of a filter assigned to the camera 12. The image analysis according to the invention is then carried out e.g. by the sensor being read out line by line, wherein in each line those pixels whose luminous properties lie above a specific threshold value are identified as relevant pixels. After the detection of these relevant pixels in a line, for each pixel collection a line segment (slice) with a respective centroid portion is ascertained and the next sensor line is subsequently examined. With such a systematic image or sensor signal analysis, all luminous points generated by the light emitting diodes can be rapidly detected and localized in the image. From the arrangement of the points in the image, it is then possible to determine an orientation of the contact sensing tool 22 and, in joint consideration with the position of the reflector 21, the exact spatial position and orientation of the contact sensing tool 22 with six degrees of freedom (6-DoF). From the defined position of the contact point 23 with respect to the markings 22 and the reflector 21, a contact point position is thus likewise determined exactly.

Figure 2:
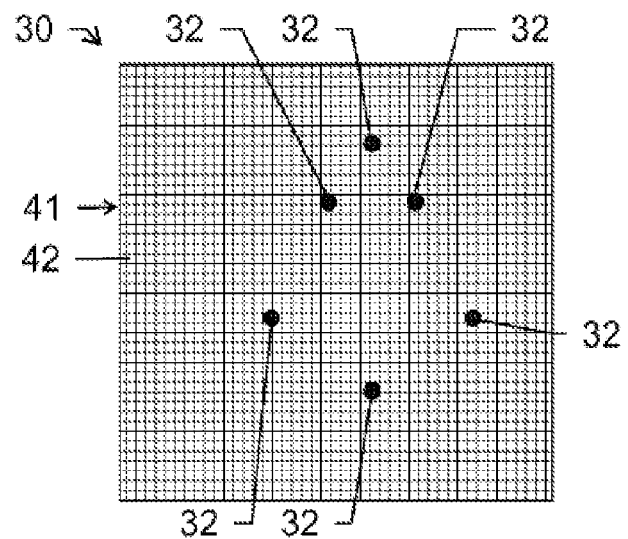
FIG. 2 shows an image detection sensor for an image analysis method according to the invention.

FIG. 2 shows an image detection sensor 30 for an image analysis method according to the invention. In this case, the sensor 30, for example a CMOS, is constructed from sensor lines 41 having a defined number of pixels 42. By way of example, a CMOS can have 1024 lines 41 each having 1024 pixels 42. During the recording of an image with this sensor 30, each individual pixel 42 detects image information, which can in turn be read out from the sensor 30 pixel by pixel. Furthermore, light point positions 32 of light points which are detected by the sensor 30 and which are generated in particular by light emitting diodes on the contact sensing tool are represented on the sensor 30.

Figure 3:
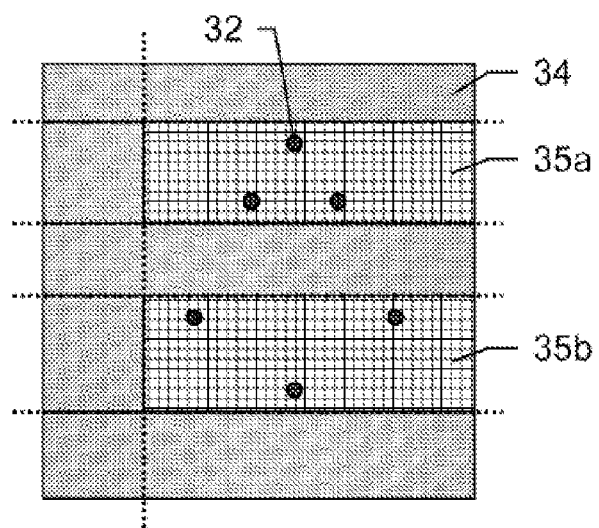
FIG. 3 shows a first embodiment of an image evaluation according to the invention for the localization of light points in the image.

FIG. 3 shows a first embodiment of an image evaluation according to the invention for the localization of light points 32 in the image. In this case, as a result of a definition of regions of interest, ROI, 35a, 35b on the sensor, only those image information of the pixels within the regions 35a, 35b are used for image processing. The image information of the remaining sensor region 34 is not taken into account any further in this case. With this technique, the volume of data to be analyzed can be significantly reduced and the speed of the image processing process can thus be increased. The determination of the regions of interest 35a, 35b is performed in this embodiment in such a way that large-area, contiguous sensor regions are still omitted in the image analysis and the light points 32 to be detected lie within the regions of interest 35a, 35b. The size and position of said regions of interest 35a, 35b on the sensor can be continuously updated, wherein e.g. a movement of the contact sensing tool can be anticipated by means of a mathematical analysis. For this purpose, by way of example, measurement information, such as e.g. the number of light points, the change in the position of the light points 32 with regard to the last two images detected, and the distance to the reflector, can be made available to a Kalman filter and an expected value, in particular for a further alteration of the respective light point position, can thus be determined for each light point 32 to be detected. An enhancement of the analysis process can be achieved even with a still high degree of coverage of the sensor by the regions of interest 35a, 35b and a thus relatively large sensor area to be evaluated. By way of example, just one region of interest with a large region of coverage in relation to the total sensor area can already lead to faster read-out rates. In particular, e.g. ten regions of interest (multiple regions of interest=MROI), in the case of ten auxiliary point markings to be detected, in each case with a comparatively small area to be taken into account, can be set and the region of coverage can thus be reduced further and the analysis process can be accelerated further. In this case, as a result of a at a high repetition rate for detecting images and for setting the regions, the regions can be set to be smaller in order nevertheless with high probability to achieve detection of the marking in the respective region. At a lower rate, therefore, these high probabilities can be achieved with regions of interest that are set to be larger.

Figure 4C:
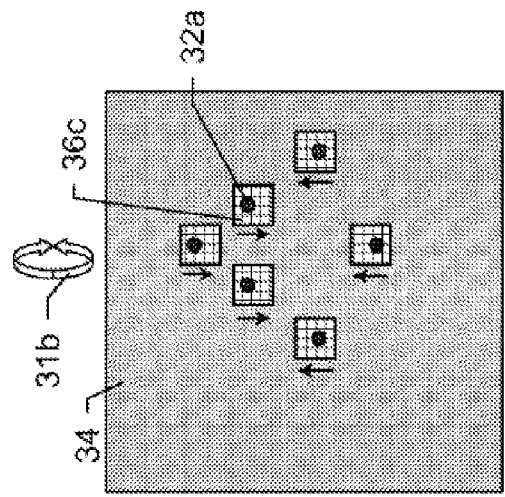
FIGS. 4a-c show a second embodiment of an image evaluation according to the invention for the localization of light points in the image.
Figure 4B:
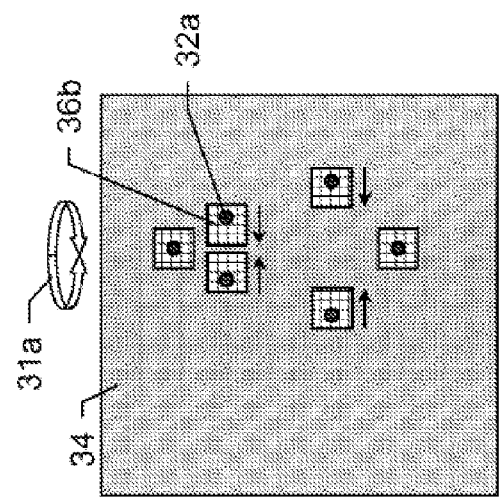
Figure 4A:
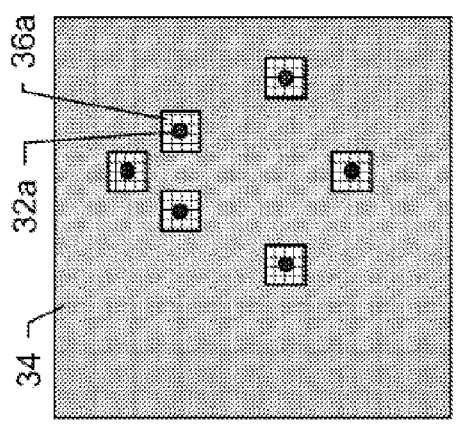

FIGS. 4a-c show a second embodiment of an image evaluation according to the invention for the localization of light points 32a in the image and the adaptation of the regions of interest (ROI) 36a, 36b, 36c shown, depending on a change in the position of the light points 32a. In this embodiment, a main part 34 of the detection area of the sensor is not used for identifying and determining the position of the light points 32a. FIG. 4a shows, by way of example, a light point 32a and a region of interest 36a around the light point 32a. The image information of the pixels which lie within this region of interest 36a is transferred to an image processing algorithm for the detection of the light point 32a and is taken into account for further evaluation. On account of the advantageous ratio of regions 34 not to be taken into account to regions 36a to be taken into account, the image processing and thus the determination of the orientation of a contact sensing tool can be carried out very rapidly. FIG. 4b shows an altered constellation of light points, wherein here the contact sensing tool detected in FIG. 4a was detected with an altered orientation. The alteration of the orientation is indicated by the double-headed arrow 31a. The contact sensing tool was thus rotated about a vertical axis in contrast to its alignment in FIG. 4a, as a result of which the light points detected on the sensor in each case move closer together in a horizontal direction (see arrows). Moreover, the region of interest 36b of the sensor is displaced, e.g. on the basis of calculations of the Kalman filter, in such a way that upon a further rotation of the contact sensing tool about the vertical axis and, associated therewith, further movement movement together of the light points, the latter lie with a high probability in the respective ROI, in particular the light point 32a lies with a high probability in the region of interest 36b. By means of this predefinition of the position of the region of interest 36b, it is possible to take account of an expected alteration of the orientation or the alignment of the contact sensing tool during the detection and evaluation of the light point 32a. A further example of the anticipation of the change in orientation is shown in FIG. 4c, wherein the alignment in this case is effected about a horizontal axis—as indicated by the arrow 31b—and a change in the position of the region of interest 36c takes place in the vertical direction (see arrows).

FIG. 5 shows the sequence of the image detection and evaluation according to the invention according to the first and/or second embodiment in a block diagram. Firstly, an image is detected by means of a CMOS sensor 50. From the sensor 50, the pixel data are read out and fed to a light point evaluation 55. The light point data generated here, such as e.g. position or size of the points, are transferred to a light point tracking unit 56, wherein, by means of a region of interest calculation unit 57, information regarding the configuration of the CMOS sensor is generated and communicated to the latter. By means of a such a region of interest control unit 58 according to the invention, comprising the light point tracking 56 and the ROI calculation 57, it is thus possible to optimize the data stream between the CMOS sensor 50 and the light point evaluation 55 and to obtain a faster data evaluation.

In this case, firstly only the relevant sensor data within the ROIs are read out, then the points are detected and the optimum size, position and number of regions of interest (ROIs) are determined by means of a point tracking algorithm. In addition—in particular in order to improve the process effectiveness—some points can be combined to form a group of points. Furthermore—by means of a correspondingly configured sensor—it is possible to adapt the regions of interest on the sensor with the aid of the information generated during point tracking in real time, wherein each point can be individually tracked and each region of interest can correspondingly be updated independently. Moreover, by means of the point tracking algorithm, point movement can be calculated in such a way that the position of individual points can also be determined outside the field of view of the sensor or the camera.

FIGS. 6a-c show a further embodiment of an image evaluation according to the invention for the localization of light points 32, 32b in the image. FIG. 6a once again shows a sensor 30 constructed in lines with positions of detected light points 32, 32b. A sensor region A is additionally marked. FIG. 6b shows an enlarged illustration of the region A consisting of four sensor lines with the light point 32b. FIG. 6c illustrates the sensor region A with further enlargement, the lines 37a-d of the sensor 30 being considered individually below for describing the method for image evaluation.

The evaluation of an image detected by the sensor 30 is carried out line by line. By means of the light point 32b detected by the sensor 30, the sensor generates image information depending on the position of the light point 32b. Specifically, the pixels 38a-d of the sensor to which the position of the light point 32b corresponds detect a respective item of image information, in particular wherein this information is represented by a respective pixel signal. During the read-out of the first sensor line 37a shown, the pixels 38a are thus identified as such pixels 38a whose exposure state, since these are illuminated as part of the light point 32b, lies above a specific threshold value. According to the invention, these pixels 38a are then assigned a line segment 39a which has firstly the position of the pixels 38a on the sensor 30 or in the line 37a and secondly the number of pixels 38a contained in the line segment 39a and thus the size of the line segment 39a. In addition, for each line segment 39a found in the line 37a, a pixel centroid portion is calculated from the position and number of the pixels 38a. This centroid calculation can be carried out very rapidly, in particular in real time, i.e. in association with a pixel read-out speed. Once the first line 37a has been completely searched, the search is continued for further pixels 38b-d, the exposure state of which lies above the threshold value, in the following lines 37b-d. This likewise involves extraction of line segments 39b-d and corresponding determination of respective centroid portions. This type, according to the invention, of image or sensor signal evaluation enables the detected information to be continuously rapidly read out and transferred. In evaluation methods according to the prior art, a complete item of image information is read out and only afterward is said information processed further. In this case, the line segments 39a-d constitute coherent line regions, which may have gaps within a line segment 39a-d. Said gaps can arise, for example, as a result of so-called "hot pixels" (=defects on the sensor), wherein individual or a plurality of, in particular fixed, pixels may be "blind" and therefore not functional. The positions of such defective pixels may be previously known for an (or on an) image-detecting sensor or can be identified as defects on the sensor e.g. from a comparison of previously determined image positions in detected images. Therefore, the coherent line regions can be determined by pixels whose exposure value lies above a predefined threshold value, taking account of such defective pixels. In order to find those line segments 39a-d which belong in each case to identical detected points, normally those line segments 39a-d which overlap in columns on the sensor are assigned to one another (grouped). In addition, in a special case it can also happen that such line segments 39a-d which are arranged in a manner diagonally adjoining one another are to be linked to one another in order to respectively assign to one another the line segments 39a-d which belong to identical points.

Figure 7:
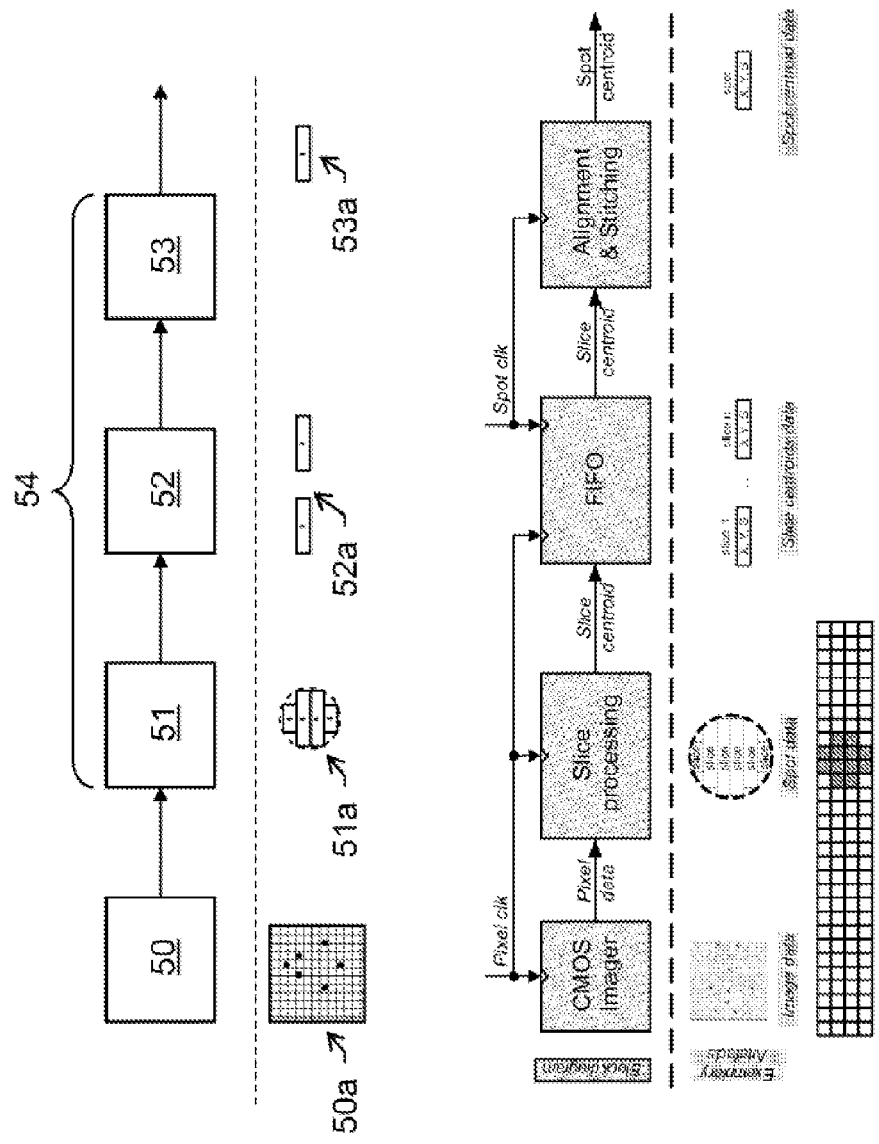
FIG. 7 shows a further block diagram for a sequence of a further image detection and image evaluation according to the invention.

This line segment processing 51 is illustrated in a broader context in a block diagram for a sequence of an image detection and image evaluation according to the invention in FIG. 7, wherein line segments 51a associated with a light point are shown. In this case, the point identification begins with the detection of the image 50a by the CMOS sensor 50. The centroid information 52a ascertained by the light segment processing 51 is furthermore transferred to a further evaluation unit 52, which processes the incoming data according to the FIFO principle (first-in/first-out), and stored. In this case, data enter into the FIFO memory with a relatively high clock rate and low clock duration and data are output with a comparatively low clock rate and high clock duration. Thus, each line segment 39a-d can be represented by a relatively small number of parameters and it is possible to achieve a first, efficient data reduction at an early data processing stage. During subsequent joining together 53, those line segments 39a-d which are to be assigned to a point can be joined together and arranged. With the line segments 39a-d joined together in this way, with the aid of corresponding centroid portion information a renewed (cross-line) centroid calculation can then be carried out and it is possible to ascertain a total centroid or total centroid information 53a for a number of line segments 39a-d, which represents the position of the light point respectively detected. Owing to a high computational complexity, the joining together 53 and renewed centroid calculation can be carried out here with a lower processing speed (compared with the speed for reading out the pixels). The process effectiveness is nevertheless not limited here by virtue of the preceding data reduction. The line segment processing 51, the FIFO evaluation unit 52 and the joining together 53 can be combined here under point identification and centroid determination 54.

FIGS. 8a-b show further block diagrams showing the sequence of an image evaluation from the image detection 61 up to the further processing of the evaluated image information according to the prior art. FIG. 8a illustrates this evaluation process in detail, whereas FIG. 8b illustrates the process in a simplified manner and will be consulted for the following description.

A first step involves the image detection, in particular of an auxiliary measuring instrument with markings arranged in a defined manner. This detection can be carried out in a manner controlled by a synchronization and trigger unit 63, or initiated in a temporally defined manner. The image is then transferred to an image processing unit for the image analysis 62, the image being evaluated with regard to the exposure values of the sensor pixels generated during the image detection. In the context of the image analysis 62, in addition, for each marking of the auxiliary measuring instrument detected in the image, a centroid in the image and thus an image position of the centroid is ascertained mathematically. The sum of the information thus generated is then made available to a further processor unit 64 for example for determining the orientation of the auxiliary measuring instrument from the ascertained image positions. Between the processor unit 64 and the unit for image detection 61 (CMOS) there is a connection 65, by means of which control of the area sensor can be carried out by the processor unit 64.

FIGS. 9a-b show further block diagrams showing the sequence of an image evaluation according to the invention. FIG. 9a illustrates this evaluation process in detail, whereas FIG. 9b in turn illustrates the process in a simplified manner and will be consulted for the following description.

In this embodiment, the image evaluation is carried out, in principle, according to the evaluation sequence in accordance with FIGS. 8a-b, the image analysis 62 being adapted and improved by the point identification and centroid determination functionality 54 according to the invention. The image information detected during the image detection 61 is transmitted to the image analysis 62 via a sensor interface, the evaluation of the image being carried out by means of the functionality 54 according to the invention, which is performed by an adapted algorithm, for example. In the context of the functionality 54, the pixels of the sensor are then read out sequentially with regard to a respective current exposure value and corresponding line segments are extracted on the basis of those pixels whose exposure value lies above a threshold value. This is followed by calculating a centroid for each line segment and grouping the segments which belong to identical imaged markings of the contact sensing tool. From the centroids of the line segments of a respective grouping, image positions are then derived with respect to the markings (see description concerning FIG. 7) and the position information thus generated is transferred to the processor unit 64. With this point identification and centroid determination functionality 54 according to the invention, the image analysis 62 can be carried out more rapidly and an increase in an image processing rate can thus be obtained. The rate of the analyzable images can thereby be increased by a factor of six, in particular, in comparison with the prior art method in accordance with FIGS. 8a-b.

FIGS. 10a-b show two further block diagrams showing the sequence of a further image evaluation according to the invention. FIG. 10a once again illustrates this evaluation process in detail, whereas FIG. 10b illustrates the process in a simplified manner and will be consulted for the following description.

In the context of this embodiment, the image evaluation is in turn carried out, in principle, according to the evaluation sequence in accordance with FIGS. 8a-b, firstly the image analysis 62 being adapted and improved by the point identification and centroid determination functionality 54 according to the invention, and secondly the processor unit 64 having a region of interest control unit 58 according to the invention. In this case, the region of interest control unit 58 has a functionality according to the invention for determining defined regions of interest (multiple regions of interest=MROI) on the area sensor of the camera, the regions of interest each having a delimited subset of contiguous neighboring pixels from the totality of the pixels of the area sensor. In this case, the regions of interest are set by means of the functionality continuously depending on a collection of image positions determined in at least one previously detected camera image. To put it another way, therefore, regions are predefined on the CMOS, in which regions a marking to be detected is detected as expected during the recording of a next image. In this case, the position and size of the respective regions can be determined in particular by calculations by means of a Kalman filter. In this case, the filter can be fed in a large amount of measurement-relevant information, such as e.g. the distance with respect to the markings, the size of the markings, the number and position of the markings on an auxiliary measuring instrument or the brightness distribution in the measurement environment. The definition and adaptation of these regions can be carried out for example in the case of a change in the orientation of the auxiliary measuring instrument by means of a rotation about the vertical axis thereof in such a way that the regions of interest (ROIs) in the sensor area are displaced horizontally such that a horizontal moving together of the markings that is to be expected as a result of the rotation is anticipated and the markings, during the rotation continuously lie in a respective correspondingly updated region of interest (ROI). In order to ensure that in each case only the pixels of the sensor that lie within the ROIs are read out during the respective read-out passes, the area sensor can be designed in such a way that it is reconfigurable in real time with regard to the respective read-out passes, that is to say that the setting and definition of the regions of interest—which influence the read-out passes—on the sensor can be carried out in real time (i.e. with such rates which are also used for carrying out the image detection and/or the read-out passes). As a result, the regions of interest can be redefined before every detection of a camera image and an image with regions of interest adapted to the measurement situation can be detected in each case (or only those pixels which lie in these ROIs can respectively be read out in this case).

The image detection unit 61 can be controlled by means of an interface 65 between the image detection unit 61 and the processor unit 64. In this case, the regions of interest for the area sensor (CMOS), said regions of interest respectively being determined and updated by means of the functionality of the region of interest control unit 58, can be transferred to the image detection unit 61 and, in a manner dependent thereon, in each case only that image information which is detected within the regions of interest determined in this way is forwarded to the image analysis 62 for image processing with the point identification and centroid determination functionality 54. This further processing then results (as described above) in the image positions for the detected markings, from which an orientation of the auxiliary measuring instrument can be derived.

With this combination of the point identification and centroid determination functionality 54 according to the invention and the functionality of the region of interest control unit 58, the efficiency of the image processing and evaluation can be improved further and a further increase in an image processing rate can be obtained. The rate of the analyzable images can be increased here in particular by a factor of twelve in comparison with the prior art method in accordance with FIGS. 8a-b.

It goes without saying that these illustrated figures only schematically illustrate possible exemplary embodiments. The different approaches can, according to the invention, likewise be combined with one another and with methods for determining a spatial position of an object, with methods for image evaluation and with measuring devices from the prior art. In this regard, the aspects according to the invention can also be used for controlling the continuous read-out processes of an area sensor of geodetic surveying devices—such as total stations and tachymeters (in particular in this case for the area sensors for the target tracking of reflector prisms)—or for continuously evaluating the images detected in this case.

What is claimed is:

1. A position determining method for continuously determining the spatial position of an auxiliary measuring instrument having at least one auxiliary point marking, wherein the auxiliary measuring instrument has a plurality of auxiliary point markings in fixed known spatial distribution relative to one another, comprising:
   continuously detecting camera images of the at least one auxiliary point marking using a camera with an area sensor having a plurality of pixels;
   continuously carrying out read-out passes in which at least some of the pixels are read out with regard to a respective current exposure value;
   continuously determining at least one image position for the at least one imaged auxiliary point marking in the respective current camera image, depending on exposure values obtained in the context of the respective current read-out pass; and
   continuously deriving the respective current spatial position of the auxiliary measuring instrument on the basis of the at least one current image position, wherein:
      at least one respective current region of interest is continuously set on the area sensor depending on a collection of the at least one determined image position in at least one previously detected camera image;
      the at least one region of interest, in each case, defines a delimited subset of contiguous neighboring pixels from the totality of the pixels of the area sensor; and
      the at least one current image position is determined taking account of exclusively at most those current exposure values which are obtained from pixels of the area sensor which lie within the at least one currently set region of interest.

2. The position determining method as claimed in claim 1, wherein:
   the respective current read-out passes are carried out in such a way that, in each case, only exactly the pixels which lie within the at least one current region of interest are read out.

3. The position determining method as claimed in claim 1, further comprising:
   for the at least one respective current region of interest, ascertaining an expected value for the at least one current image position, in each case, from a collection of the at least one image position determined in a plurality of previously successively detected camera images.

4. The position determining method as claimed in claim 3, wherein:
   ascertaining the expected value is performed using a Kalman filter.

5. The position determining method as claimed in claim 1, wherein continuously determining the at least one image position comprises:
   filtering pixels for which the exposure value obtained during read-out fulfills a threshold value criterion by lying above a threshold value;
   joining together filtered pixels that form line regions that are coherent in a line of the area sensor, in each case, to form pixel slices;
   ascertaining respective centroid portions for each of the pixel slices;
   grouping the pixel slices in such a way that such pixel slices which belong to the at least one imaged auxiliary point marking are, in each case, assigned to one another; and
   deriving the at least one image position of the at least one auxiliary point marking with the aid of the corresponding respective centroid portions of the pixel slices which are, in each case, assigned to one another.

6. The position determining method as claimed in claim 5, wherein:
   filtering pixels, joining together to form pixel slices and ascertaining the respective centroid portions is carried out with a first, comparatively high, clock rate, which specifically corresponds to the pixel read-out clock rate; and
   grouping the pixel slices and determining the at least one image position are carried out with a second, comparatively low, clock rate.

7. A computer program product having program code stored on a non-transitory machine-readable medium or device, the program code, when executed, controlling or performing the position determining method as claimed in claim 1.

8. A measuring device for continuously determining the spatial position of an auxiliary measuring instrument having at least one auxiliary point marking, wherein the auxiliary measuring instrument has a plurality of auxiliary point markings in fixed known spatial distribution relative to one another, comprising
   a camera for continuously detecting camera images of the at least one auxiliary point marking, with an area sensor having a plurality of pixels; and
   an evaluation and control unit including a computing device having program code stored on a non-transitory machine-readable carrier, the program code, when executed, controlling or performing acts to:
      control read-out passes which can be carried out continuously and in which at least some of the pixels are read out with regard to a respective current exposure value;

continuously determine at least one image position for the at least one imaged auxiliary point marking in the respective current camera image depending on exposure values obtained in the context of the respective current read-out pass;

continuously derive the respective current spatial position of the auxiliary measuring instrument on the basis of the at least one current image position; and continuously set, in each case, at least one current region of interest on the area sensor, depending on a collection of the at least one image position determined in at least one previously detected camera image, wherein the at least one current region of interest, in each case, defines a delimited subset of contiguous neighboring pixels from the totality of the pixels of the area sensor, wherein:

for the determination of the respective at least one current image position, the evaluation and control unit uses exclusively at most those current exposure values which are obtained from pixels of the area sensor which lie within the at least one currently set region of interest.

9. The measuring device as claimed in claim 8, wherein: the evaluation and control unit is configured to control the read-out passes in such a way that, in each case, only exactly the pixels which lie within the at least one current region of interest are read out.

10. The measuring device as claimed in claim 8, wherein: the evaluation and control unit is configured to ascertain an expected value for the at least one image position, in each case, from a collection of the at least one image position determined in a plurality of previously successively detected camera images.

11. The measuring device as claimed in claim 10, wherein: the expected value is ascertained using a Kalman filter.

12. The measuring device as claimed in claim 8, wherein: the camera has a lens having a variable focal length, wherein the focal length, and thus the imaging scale of the camera, is continuously variable in a manner automatically controlled by the evaluation and control unit in such a way that the auxiliary measuring instrument is imaged distance-independently substantially with a constant extent on the area sensor; and the camera has a panfocal or varifocal lens having variable focal length and focusing.

13. The measuring device as claimed in claim 8, further comprising:

a base;

a motorized adjusting device for changing an alignment of the camera relative to the base in a motorized manner;

angle measuring sensor for continuously detecting the respective current alignment of the camera, wherein:

the evaluation and control unit is configured to continuously control the changing of the alignment of the camera in such a way that the camera is continuously substantially aligned with the auxiliary measuring instrument.

14. The measuring device as claimed in claim 13, wherein the measuring device is a laser tracker and further comprises:

at least one optical distance measuring apparatus which measures in the direction of a target axis and serves for measuring distances to a retroreflector provided on the auxiliary measuring instrument;

a motorized adjusting device for changing an alignment of the target axis relative to the base in a motorized manner;

angle measuring sensor for continuously detecting the respective current alignment of the target axis; and a measuring and control circuit for tracking the retroreflector of the auxiliary measuring instrument with the target axis, such that the latter is continuously aligned with the retroreflector.

15. A measuring system comprising:

a measuring device as claimed in claim 8; and an auxiliary measuring instrument having at least one auxiliary point marking in particular light points, wherein:

the auxiliary measuring instrument has a plurality of auxiliary point markings in fixed known spatial distribution relative to one another; and the auxiliary measuring instrument has a retroreflector in addition to the at least one auxiliary point markings.

16. A position determining method for continuously determining the spatial position of an auxiliary measuring instrument having at least one auxiliary point marking, wherein the auxiliary measuring instrument has a plurality of auxiliary point markings in fixed known spatial distribution relative to one another, comprising:

continuously detecting camera images of the at least one auxiliary point marking using a camera with an area sensor having a plurality of pixels;

continuously carrying out read-out passes in which at least some of the pixels are read out with regard to a respective current exposure value;

continuously determining at least one image position for the at least one imaged auxiliary point marking in the respective current camera image depending on exposure values obtained in the context of the respective current read-out pass; and continuously deriving the respective current spatial position of the auxiliary measuring instrument on the basis of the at least one current image position, wherein:

continuously determining the at least one image position includes:

filtering pixels for which the exposure value obtained during read-out fulfills a threshold value criterion by lying above a threshold value;

joining together filtered pixels that form line regions that are coherent in a line of the area sensor in each case to form pixel slices;

ascertaining respective centroid portions for each of the pixel slices;

grouping the pixel slices in such a way that such pixel slices which belong to the at least one imaged auxiliary point markings are, in each case, assigned to one another; and deriving the at least one image position of the at least one auxiliary point marking with the aid of the corresponding respective centroid portions of the pixel slices which are, in each case, assigned to one another.

17. The position determining method as claimed in claim 16, wherein:

in the context of the read-out passes, the area sensor is read out pixel by pixel and line by line with a predefined pixel read-out rate; and at the latest directly after completion of the read-out of respectively one line, already for this one line the steps of filtering, joining together and ascertaining respective centroid portions, which steps are carried out in the context of determining the at least one image position, are started and carried out.

18. The position determining method as claimed in claim 17, wherein:

the steps of filtering, joining together to form pixel slices and ascertaining the centroid portions are clocked with a first, comparatively high, rate, which specifically corresponds to the pixel read-out rate; and the steps of grouping and determining the image positions are clocked with a second, comparatively low, rate.

19. A computer program product having program code stored on a non-transitory machine-readable medium or device, the program code, when executed, controlling or performing acts of the position determining method of claim 16 including, in the context of determining the at least one image position:

filtering pixels;

joining together filtered pixels that form line regions that are coherent in a line of the area sensor in each case to form pixel slices;

ascertaining respective centroid portions;

grouping; and deriving the at least one image position of the at least one auxiliary point marking with the aid of the corresponding respective centroid portions of the pixel slices which are, in each case, assigned to one another.

20. A measuring device for continuously determining the spatial position of an auxiliary measuring instrument having at least one auxiliary point marking, wherein the auxiliary measuring instrument has a plurality of auxiliary point markings in fixed known spatial distribution relative to one another, comprising:

a camera for continuously detecting camera images of the at least one auxiliary point marking on an area sensor having a multiplicity of pixels;

an evaluation and control unit including a computing device having program code stored on a non-transitory machine-readable carrier, the program code, when executed, controlling or performing acts to:

control read-out passes, which can be carried out continuously and in which at least some of the pixels of the area sensor are read out with regard to a respective current exposure value;

continuously determine at least one image position for the at least one imaged auxiliary point marking in the respective current camera image, depending on exposure values obtained in the context of the respective current read-out pass;

continuously derive the respective current spatial position of the auxiliary measuring instrument on the basis of the at least one current image position; and in the context of determining the at least one image position, automatically perform, using a correspondingly preprogrammed Field Programmable Gate Array (FPGA) or Application Specific Integrated Circuit (ASIC):

filtering pixels for which the exposure value obtained during read-out fulfills a threshold value criterion, in particular lies above a threshold value;

joining together filtered pixels that form line regions that are coherent in a line of the area sensor in each case to form pixel slices;

ascertaining respective centroid portions for each of the pixel slices;

grouping the pixel slices in such a way that such pixel slices which belong to the at least one imaged auxiliary point marking are in each case assigned to one another; and deriving the at least one image position of the at least one auxiliary point marking with the aid of the corresponding respective centroid portions of the pixel slices which are in each case assigned to one another.

21. The measuring device as claimed in claim 20, further comprising:

a base;

a motorized adjusting device for changing an alignment of the camera relative to the base in a motorized manner;

angle measuring sensor for continuously detecting the respective current alignment of the camera, wherein:

the evaluation and control unit is configured to continuously control the changing of the alignment of the camera in such a way that the camera is continuously substantially aligned with the auxiliary measuring instrument.

22. The measuring device as claimed in claim 21, wherein the measuring device is a laser tracker and further comprises:

at least one optical distance measuring apparatus which measures in the direction of a target axis and serves for measuring distances to a retroreflector provided on the auxiliary measuring instrument;

a motorized adjusting device for changing an alignment of the target axis relative to the base in a motorized manner;

angle measuring sensor for continuously detecting the respective current alignment of the target axis; and a measuring and control circuit for tracking the retroreflector of the auxiliary measuring instrument with the target axis, such that the latter is continuously aligned with the retroreflector.

23. A measuring system comprising:

a measuring device as claimed in claim 20; and an auxiliary measuring instrument having at least one auxiliary point marking in particular light points, wherein:

the auxiliary measuring instrument has a plurality of auxiliary point markings in fixed known spatial distribution relative to one another; and the auxiliary measuring instrument has a retroreflector in addition to the at least one auxiliary point markings.

* * * * *